US009053569B2

(12) United States Patent
Bal et al.

(10) Patent No.: US 9,053,569 B2
(45) Date of Patent: Jun. 9, 2015

(54) GENERATING ATTENUATION CORRECTION MAPS FOR COMBINED MODALITY IMAGING STUDIES AND IMPROVING GENERATED ATTENUATION CORRECTION MAPS USING MLAA AND DCC ALGORITHMS

(71) Applicants: Girish Bal, Knoxville, TN (US); Frank Kehren, Knoxville, TN (US); Vladimir Y. Panin, Knoxville, TN (US); Christian J. Michel, Lenoir City, TN (US); Johan Nuyts, Heverlee (BE)

(72) Inventors: Girish Bal, Knoxville, TN (US); Frank Kehren, Knoxville, TN (US); Vladimir Y. Panin, Knoxville, TN (US); Christian J. Michel, Lenoir City, TN (US); Johan Nuyts, Heverlee (BE)

(73) Assignee: Siemens Medical Solutions USA, Inc., Malvern, PA (US)

(*) Notice: Subject to any disclaimer, the term of this patent is extended or adjusted under 35 U.S.C. 154(b) by 18 days.

(21) Appl. No.: 13/970,753

(22) Filed: Aug. 20, 2013

(65) Prior Publication Data
US 2014/0056500 A1    Feb. 27, 2014

Related U.S. Application Data

(60) Provisional application No. 61/691,996, filed on Aug. 22, 2012.

(51) Int. Cl.
*G06K 9/00* (2006.01)
*G06T 11/00* (2006.01)

(52) U.S. Cl.
CPC .................................. *G06T 11/005* (2013.01)

(58) Field of Classification Search
None
See application file for complete search history.

(56) References Cited

U.S. PATENT DOCUMENTS

| 7,737,406 B2* | 6/2010 | Vija et al. ................. 250/363.04 |
| 8,618,490 B2* | 12/2013 | Fenchel et al. ........... 250/363.04 |
| 2009/0225933 A1* | 9/2009 | Shao et al. ..................... 378/15 |
| 2009/0278049 A1* | 11/2009 | Ladebeck ................. 250/361 R |
| 2009/0310746 A1* | 12/2009 | Ye et al. .......................... 378/62 |

(Continued)

OTHER PUBLICATIONS

Chatelain, et al., "SPECT/CT registration with the DCC and MC simulations for SPECT imaging", Nuclear Science Symposium Conference Record, 2004 IEEE, vol. 6, No., pp. 3551,3554 vol. 6, Oct. 16-22, 2004.

(Continued)

*Primary Examiner* — Tahmina Ansari
(74) *Attorney, Agent, or Firm* — Peter Kendall

(57) ABSTRACT

The DCC (Data Consistency Condition) algorithm is used in combination with MLAA (Maximum Likelihood reconstruction of Attenuation and Activity) to generate extended attenuation correction maps for nuclear medicine imaging studies. MLAA and DCC are complementary algorithms that can be used to determine the accuracy of the mu-map based on PET data. MLAA helps to estimate the mu-values based on the biodistribution of the tracer while DCC checks if the consistency conditions are met for a given mu-map. These methods are combined to get a better estimation of the mu-values. In gated MR/PET cardiac studies, the PET data is framed into multiple gates and a series of MR based mu-maps corresponding to each gate is generated. The PET data from all gates is combined. Once the extended mu-map is generated the central region is replaced with the MR based mu-map corresponding to that particular gate. On the other hand, in dynamic PET studies the uptake in the patient's arms reaches a steady state only after the tracer distributes throughout the body. Hence, for dynamic scans, the projection data of all frames is summed and used to generate the MLAA based extended mu-map for all frames.

12 Claims, 6 Drawing Sheets

(56) References Cited

U.S. PATENT DOCUMENTS

| | | | |
|---|---|---|---|
| 2011/0103669 A1 | 5/2011 | Michel et al. | |
| 2011/0309251 A1* | 12/2011 | Fenchel et al. | 250/362 |
| 2014/0056500 A1* | 2/2014 | Bal et al. | 382/131 |

OTHER PUBLICATIONS

Panin, et al., "Slices correlation regularization for attenuation map reconstruction using only emission data with data consistency conditions and a knowledge set", Conference Record of the 1999 International meeting on fully three-dimensional image reconstruction in radiology and nuclear medicine. 1999.

Nuyts, et al., "Completion of a truncated attenuation image from the attenuated PET emission data," Nuclear Science Symposium Conference Record (NSS/MIC), 2010 IEEE , vol., No., pp. 2123,2127, Oct. 30, 2010-Nov. 6, 2010.

* cited by examiner

GENERATING ATTENUATION CORRECTION MAPS FOR COMBINED MODALITY IMAGING STUDIES AND IMPROVING GENERATED ATTENUATION CORRECTION MAPS USING MLAA AND DCC ALGORITHMS

CROSS-REFERENCE TO RELATED APPLICATIONS AND CLAIM FOR PRIORITY

This application claims priority under 35 U.S.C. §119(e) from provisional application Ser. No. 61/691,996 filed Aug. 22, 2012, incorporated herein by reference in its entirety. This application is also related to copending application Ser. No. 12/939,701 filed Nov. 4, 2010 and assigned to the same assignee herein, the contents of which are incorporated herein by reference in their entirety.

BACKGROUND OF THE INVENTION

1. Field of the Invention

The present invention generally relates to nuclear medical imaging such as Positron Emission Tomography (PET), Single Photon Emission Computed Tomography (SPECT), and combined imaging modalities such as PET-CT (Computed Tomography), SPECT-CT, and MR-PET (Magnetic Resonance Imaging—PET). In particular, the invention relates to generation of attenuation correction maps or mu-maps for reconstruction of nuclear emission data into medical images.

2. Background

Nuclear medicine is a unique medical specialty wherein radiation is used to acquire images, which show the function and anatomy of organs, bones or tissues of the body. Radiopharmaceuticals are introduced into the body, either by injection or ingestion, and are attracted to specific organs, bones or tissues of interest. Such radiopharmaceuticals produce gamma photon emissions, which emanate from the body and are captured by a scintillation crystal, with which the photons interact to produce flashes of light or "events." Events are detected by an array of photo detectors, such as photomultiplier tubes, and their spatial locations or positions are calculated and stored. In this way, an image of the organ or tissue under study is created from detection of the distribution of the radioisotopes in the body.

One particular nuclear medicine imaging technique is known as Positron Emission Tomography, or PET. PET is used to produce images for diagnosing the biochemistry or physiology of a specific organ, tumor or other metabolically active site. Measurement of the tissue concentration of a positron emitting radionuclide is based on coincidence detection of the two gamma photons arising from positron annihilation. When a positron is annihilated by an electron, two 511 keV gamma photons are simultaneously produced and travel in approximately opposite directions. Gamma photons produced by an annihilation event can be detected by a pair of oppositely disposed radiation detectors capable of producing a signal in response to the interaction of the gamma photons with a scintillation crystal. Annihilation events are typically identified by a time coincidence between the detection of the two 511 keV gamma photons in the two oppositely disposed detectors, i.e., the gamma photon emissions are detected virtually simultaneously by each detector. When two oppositely disposed gamma photons each strike an oppositely disposed detector to produce a time coincidence event, they also identify a line of response, or LOR, along which the annihilation event has occurred. An example of a PET method and apparatus is described in U.S. Pat. No. 6,858,847, which patent is incorporated herein by reference in its entirety.

After being sorted into parallel projections, the LORs defined by the coincidence events are used to reconstruct a three-dimensional distribution of the positron-emitting radionuclide within the patient. In two-dimensional PET, each transverse section or "slice" of the radionuclide distribution is reconstructed independently of adjacent sections. In fully three-dimensional PET, the data are sorted into sets of LORs, where each set is parallel to a particular detector angle, and therefore represents a two dimensional parallel projection p(r, s, $\phi$, $\Theta$) of the three dimensional radionuclide distribution within the patient—where "r" and "s" correspond to the radial and axial distances, respectively, of the LOR from the center of the projection view and "$\phi$" and "$\Theta$" correspond to the azimuthal and polar angles, respectively, of the projection direction with respect to the z axis in (x, y, z) coordinate space (in other words, $\phi$ and $\Theta$ correspond to a particular LOR direction).

Coincidence events are integrated or collected for each LOR and stored in a sinogram. In this format, a single fixed point in the emitter distribution f(x, y) traces a sinusoid in the sinogram. Each row of a sinogram contains the LOR data for a particular azimuthal angle $\phi$; each element of the row corresponds to a distinct radial offset of the LOR from the center of rotation of the projection. Different sinograms may have corresponded to projections of the tracer distribution at different coordinates along the scanner axis and/or different polar angles with respect to the scanner's axis.

FIG. 1 shows an embodiment of an exemplary PET system. A subject 4, for example a patient, is positioned within a detector ring 3 comprising scintillation photon detectors (such as PMT, APD, SiPM . . . ) 5. In front of the scintillation photon detectors 5 are individual crystals 8, also called detectors 8. A group of four scintillation photon detectors may have an array of detectors 8 in front of them. For example, an array of eight by eight or thirteen by thirteen detectors 8 (crystals) is possible, but any other array may be selected. Each detector 8 may be an individual crystal in front of respective scintillation photon detectors. As noted, during an annihilation process two photons 7 are emitted in diametrically opposing directions as schematically illustrated in circle 6. These photons 7 are registered by the PET as they arrive at detectors 8 in the detector ring 3. After the registration, the data, resulting from the photons 7 arriving at the detectors 8, may be forwarded to a processing unit 1 which decides if two registered events are selected as a so-called coincidence event. All coincidences are forwarded to the image processing unit 2 where the final image data may be produced via mathematical image reconstruction methods. The image processing unit 2 may be connected to a display for displaying one or more processed images to a user. Positron emission tomography provides quantitative images depicting the concentration of the positron emitting substance throughout the patient. The accuracy of this quantitative measurement depends in part on the accuracy of an attenuation correction which accounts for the absorption of some of the gamma rays as they pass through the patient The attenuation correction factors modify the sinogram, which contains the number of annihilation events at each location within the field of view.

Attenuation is the loss of detection of true coincidence events because of their absorption in the body or due to their scattering out of the detector field of view. Attenuation problems are greater with PET imaging compared to traditional nuclear medicine SPECT imaging. Even though the photons are of greater energy than those used in SPECT imaging, in PET imaging two photons must escape the patient simultaneously to be detected as a true event and the total photon path distance through the object/patient from emission to detection is greater with a PET camera than with a SPECT camera. The loss of true coincidence event detection due to attenuation in PET imaging can range between 50 to 95%, especially great in a larger person.

Loss of counts due to attenuation increases image noise, image artifacts, and image distortion. Without attenuation correction, significant artifacts which may occur on whole-body PET scans include: (1) prominent activity at body surface edges due to relative low attenuation at the surfaces compared to deeper structures, (2) distorted appearance of areas of intense activity (e.g. urinary bladder) due to variable degrees of attenuation in different directions of activity originating from these areas, and (3) diffuse, relatively increased activity in tissues of relatively low attenuation (e.g. lungs). Therefore, attenuation correction of data is necessary for accurate qualitative (i.e. visually normal, increased, or decreased) and quantitative (e.g. standardized uptake values or SUVs for FOG) measurements of radio-tracer activity.

In imaging systems integrating PET and CT imaging modalities, x-rays from a CT scan are used to construct an attenuation map of density differences throughout the body that may then be used to correct for the absorption of the photons emitted from radio-tracer decay. Attenuation is much more likely in the center of the body and therefore non-attenuation-corrected images will show diffusely lower levels of activity deep in the body in comparison to the skin surface. The attenuation correction process essentially "adds counts back" into areas that are more attenuated due to their being deeper or being surrounded by relatively dense structures. Similarly, it essentially "subtracts counts" from areas that are attenuated much less than all other tissues (e.g. lungs and body surfaces). Both attenuation-corrected and non-attenuation-corrected data sets are provided for review and both should be examined by the interpreter. Reviewing both data sets sometimes allows confirmation of an abnormality or confirmation of the benignity of a process which might have been incorrectly assessed based on review of one set alone.

In imaging systems integrating PET and CT imaging modalities, a fundamental hurdle that must be overcome to create an attenuation map is the truncation of the CT image resulting from the CT imaging portion of the system having a smaller field of view than that of the PET camera. This field of view problem also exists in imaging systems that integrate PET and MR imaging modalities, resulting in an even more truncated MR image than that of a CT image resulting from an integrated PET and CT imaging system. The field of view of the PET camera within an integrated or a hybrid imaging system is approximately 60 cm. The field of view of the CT imaging modality of an integrated or a hybrid imaging system is approximately 50 cm. It is possible to overcome the truncation problem in the PET-CT integrated system by collecting image data for a patient that has their arms up over their head during the imaging process which for some patients removes truncation. A patient holding their arms over their head is not a solution for PET-MR systems. The field of view of an MR imaging modality of an integrated or a hybrid PET-MR imaging system is approximately 40-45 cm. In the MR-PET integrated imaging system the conversion of the MR image values to linear attenuation coefficients at 511 keV adds another layer of complexity, because the MR imaging signal does not correlate with electron density.

It is also contemplated that the PET-MR imaging system may be comprised of a separate PET system such as the system disclosed in FIG. 1 and a separate MR system such as that illustrated in FIG. 2. According to FIG. 2, a magnetic resonance system has a base body 11. The base body 11 embodies a magnet system by means of which magnetic fields can be generated in an excitation region 12. The magnet system includes at least one basic magnet 13 for generation of a temporally static basic magnetic field that is spatially at least essentially homogeneous within the excitation region 12. The magnet system furthermore includes a whole-body antenna 14 by means of which a radio-frequency magnetic field can be generated that is at least essentially homogeneous in the entire excitation region 12. The magnet system normally additionally includes gradient magnets for generation of gradient fields and a shielding magnet. The magnetic resonance system includes a patient bed 15 that can be moved in a travel direction z over a travel region relative to the base body 11. The travel region is determined such that—as viewed in the travel direction z—each point of the patient bed 15 can be positioned in the excitation region 12. Since the excitation region 12 normally extends over an excitation region length I which is approximately 40 to 60 cm in the travel direction z and the patient bed exhibits a length L on the order of 2 m, the travel region length of the patient bed 15 is thus inevitably a multiple of the excitation region length I. Due to the mobility of the patient bed 15, an examination subject 16 (normally a person 16) can be brought into the excitation region 12 by corresponding movement of the patient bed 15. It is possible to acquire the emitted magnetic resonance signal by means of the whole-body antenna 14 and to feed it to an evaluation device 17 by which the magnetic resonance signal can be evaluated. However, only a qualitatively low-grade reconstruction of the examination subject 16 is possible in this manner. Local coils 18 by means of which a significantly higher-grade magnetic resonance signal can be acquired (even if only over a small volume per local coil 18) are therefore normally arranged on the examination subject 6.

A method of generating a best estimate of a complete attenuation map derived from processing of a truncated image of an object collected by a second imaging modality and PET emission data for the imaged object, has been proposed (see copending '701 application incorporated herein by reference above). The method is implemented using a PET system in combination with a second imaging modality system or in a hybrid imaging system including PET imaging that is integrated with a second imaging modality, such as CT, MR or other modalities capable of providing the anatomical information required to create accurate attenuation maps for quantitative PET reconstruction. In one embodiment, the second image modality comprises a CT scanner. In another embodiment, the second image modality may be MR. An integrated system involving PET and MR imaging combines the high soft tissue contrast of MR imaging and the functional information provided by PET emission data.

In the method, a truncated image is used to generate a truncated image attenuation map that is processed in combination with PET emission data to determine the maximum likelihood of attenuation activity within the missing portion of the truncated attenuation map. The truncated image attenuation map and the estimated attenuation at the missing portion of the truncated image attenuation map are combined to create a full and more accurate attenuation map. The missing portion of the truncated attenuation map is determined by performing a plurality of steps. First, an initial estimation of attenuation coefficients within the missing portion is generated. The initial estimation is iteratively improved upon by processing each successively improved group of estimated attenuation coefficients within the missing portion of the truncated attenuation map in an iterative loop until the improvement change falls below a defined threshold improvement level. The iteratively improved estimated attenuation coefficients within the missing portion are combined with the truncated image attenuation map to generate a complete attenuation map.

The method, which incorporates a maximum-likelihood (ML) and maximum-a-posteriori (MAP) reconstruction methodology, is known as Maximum Likelihood reconstruction of Attenuation and Activity (MLAA). MLAA is based on the assumption that the radioactive tracer used has a uniform biodistribution throughout the body, such as FDG, and thus is limited to static or steady state images. Accordingly, there is a need for a method that can be used with tracers having non-uniform biodistribution, such as Ga-68 DOTATOC and C-11 choline, which have a focal uptake.

Additionally, generating an MR-PET scan mu-map in the presence of metal body implants (such as hip joints, knee joints, amalgam dental fillings, etc.) is a challenge. Accordingly there exists a need to develop an attenuation correction methodology that removes or avoids artifacts in mu-maps due to metal implants in the patient. Further, there is a need for a method to generate attenuation correction maps in dynamic and gated MR/PET cardiac studies.

SUMMARY OF THE INVENTION

In accordance with one aspect of the invention, the MLAA algorithm for generating a mu-map is modified and expanded to be used with non-uniform biodistribution tracers such as Ga68-Dotatoc and C11-Choline.

In accordance with another aspect of the invention, in gated MR/PET cardiac studies, the PET data is framed into multiple gates and a series of MR based mu-maps corresponding to each gate is generated. The number of PET emission counts detected within each gate is relatively small, resulting in a noisy estimate of the MLAA based extended mu-map. To reduce the noise in the extended mu-map, the PET data from all gates is combined. Once the extended mu-map is generated the central region is replaced with the MR based mu-map corresponding to that particular gate. On the other hand, in dynamic PET studies the uptake in the patient's arms (truncated part of the mu-map) reaches a steady state only after the tracer distributes throughout the body. Hence, for dynamic scans, the projection data of all frames is summed and used to generate the MLAA based extended mu-map for all frames.

In accordance with another aspect of the invention, the DCC or Data Consistency Condition algorithm is used in combination with MLAA. MLAA and DCC are complementary algorithms that can be used to determine the accuracy of the mu-map based on PET data. MLAA helps to estimate the mu-values based on the biodistribution of the tracer while DCC checks if the consistency conditions are met for a given mu-map. In the present invention these two complementary methods are combined to get a better estimation of the mu-values, for example: metal implants, bone, lungs, yin-yang effects in MR based mu-maps, etc.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION OF THE INVENTION

Truncation of the arms has been observed in the mu-maps generated by MR/CT imaging modality, especially for large patients. These truncated mu-maps can cause local artifacts in reconstructed PET images. To reduce the local artifacts, the MLAA algorithm is used to estimate the missing regions of the mu-maps using the untruncated PET emission data combined with the truncated MR image. The present invention expands the use of the MLAA algorithm for dynamic and gated MR/PET cardiac studies. The MLAA algorithm uses the measured counts emitted from the areas of the patient that are truncated in the MR images to estimate the missing mu-values. MLAA is a joint estimation algorithm that simultaneously estimates the emission as well as attenuation values using an intensity prior that favors mu-values of air and tissue.

In gated MR/PET cardiac studies, the PET data is framed into multiple gates and a series of MR based mu-maps corresponding to each gate is generated. The number of PET emission counts detected within each gate is relatively small, resulting in a noisy estimate of the MLAA based extended mu-map. To reduce the noise in the extended mu-map, we combine the PET data from all gates. Once the extended mu-map is generated the central region is replaced with the MR based mu-map corresponding to that particular gate. On the other hand, in dynamic PET studies the uptake in the arms (truncated part of the mu-map) reaches a steady state only after the tracer distributes throughout the body. Hence, for dynamic scans, the projection data of all frames is summed and used to generate the MLAA based extended mu-map for all frames.

DCC or Data Consistency Condition is a well-known algorithm for performing attenuation correction for 3D image data. See, e.g., Panin et al., "Application of discrete data consistency conditions for selecting regularization parameters in PET attenuation map reconstruction," Phys Med Biol. 2004 Jun. 7; 49(11):2425-36, incorporated herein by reference in its entirety; R. Faghihi and L. Desbat, "Experiments on the DCC for SPECT and CT data registration," IEEE NSSMIC Conference, 2001, incorporated herein by reference in its entirety; Chatelain et al., "SPECT/CT registration with the DCC and MC simulations for SPECT imaging," Nuclear Science Symposium Conference Record, 2004 IEEE Vol. 6, pp. 3551-3554, incorporated herein by reference in its entirety.

Figure 1:
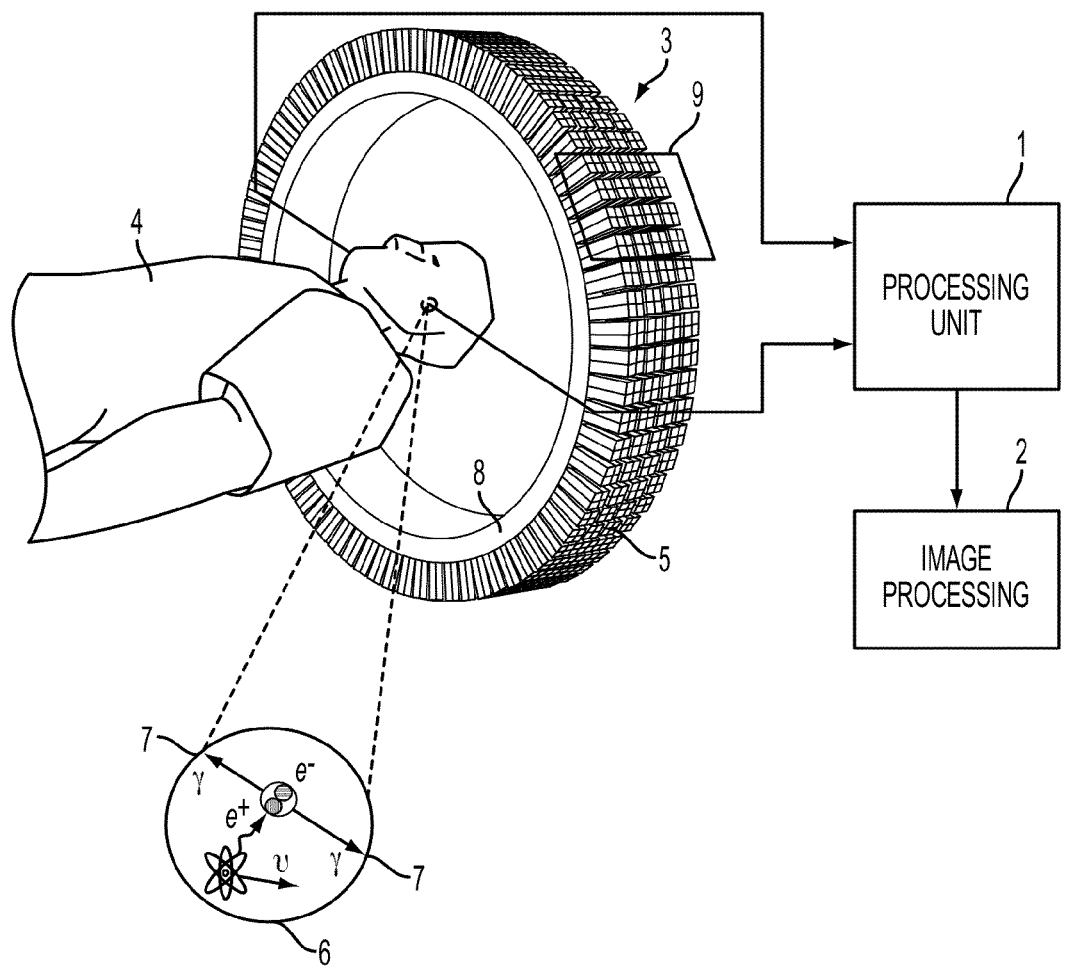
FIG. 1 is a perspective view of a PET imaging system.
Figure 2:
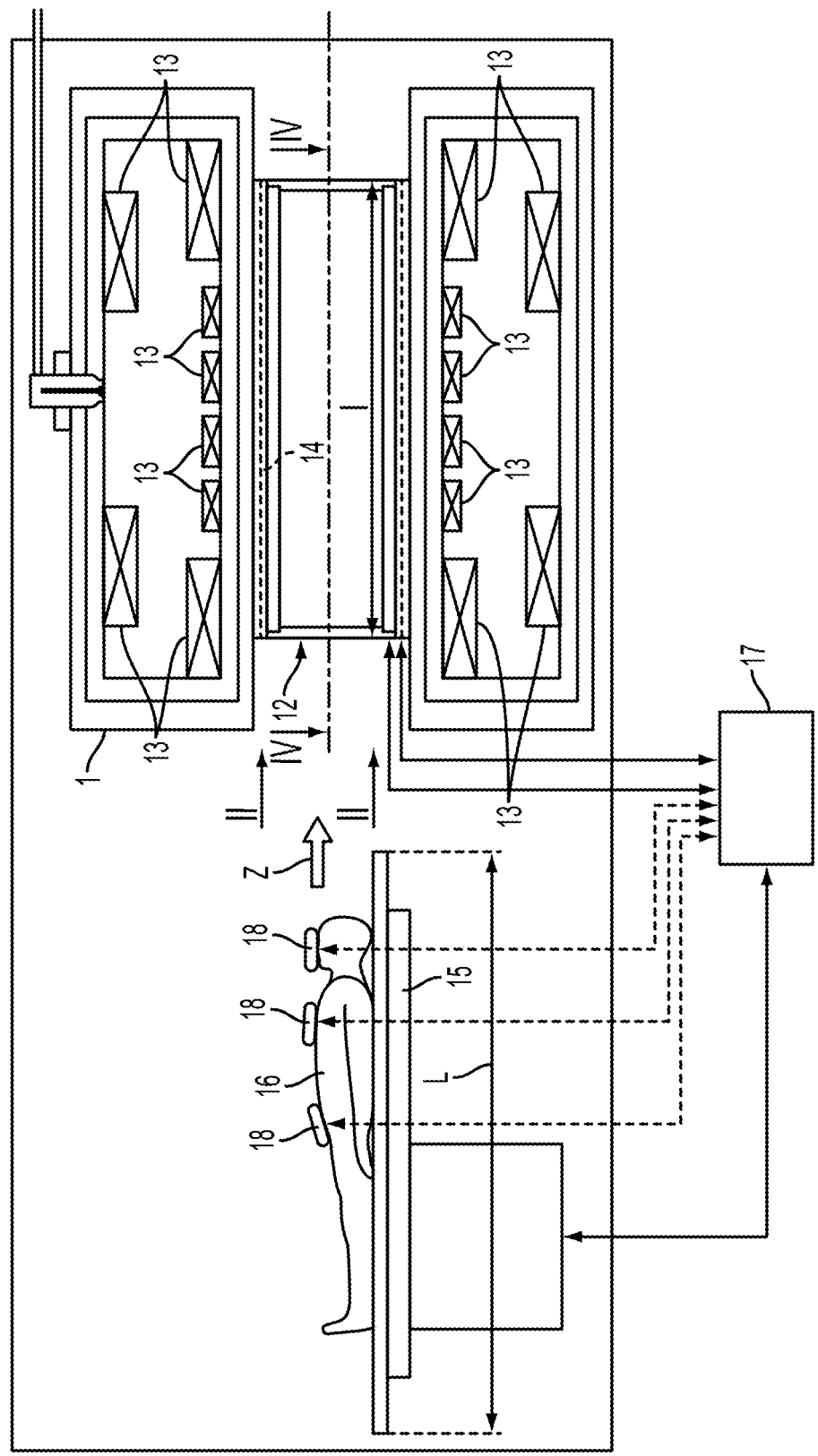
FIG. 2 is a perspective view of a PET imaging system.
Figure 3:
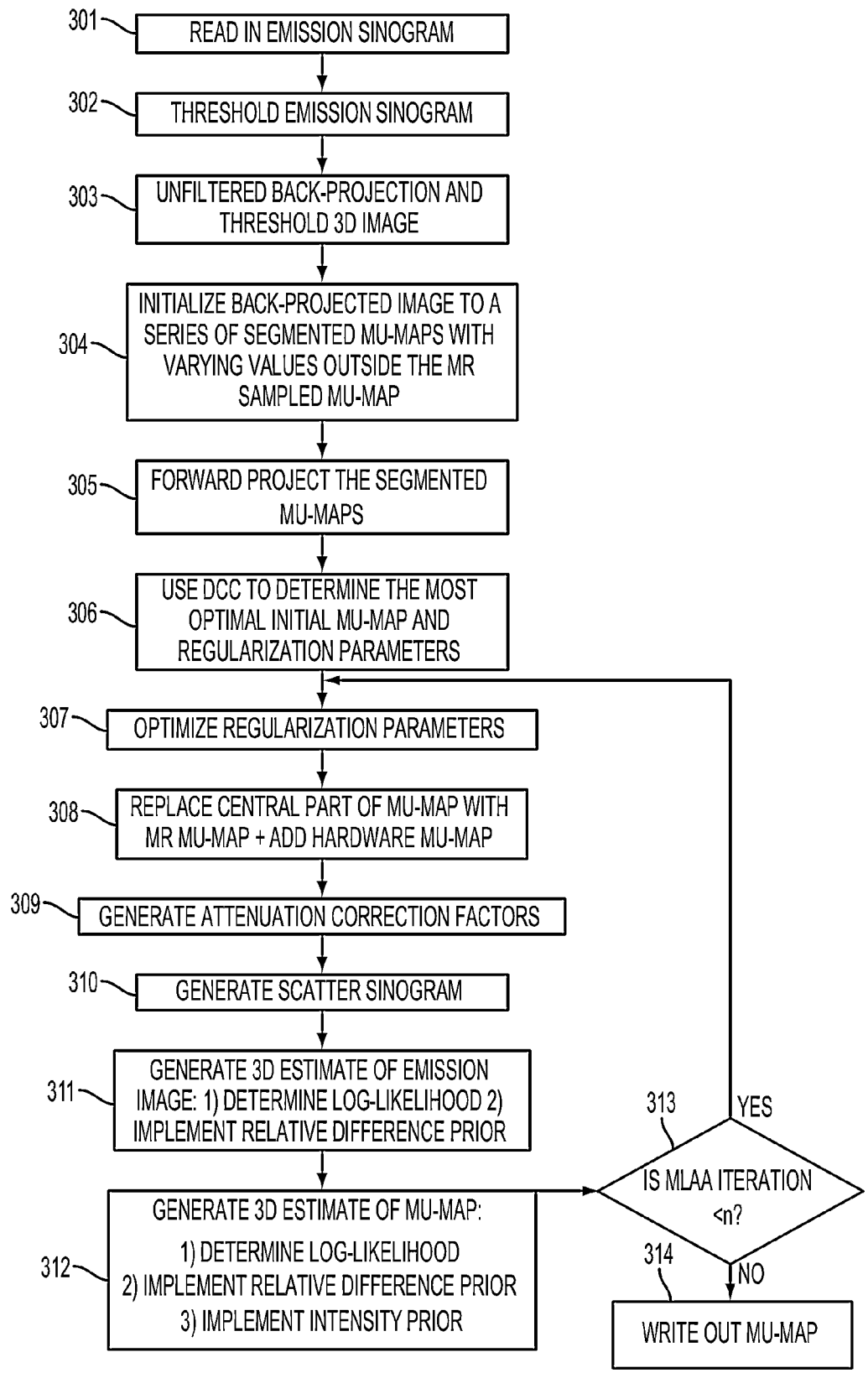
FIG. 3 is a flow diagram of a mu-map generation method according to one preferred embodiment of the invention.

In accordance with an embodiment of the invention relating to a multimodality PET study where the second modality is MR imaging, referring to FIG. 3, an iterative process for generating mu-maps using a combination of MLAA and DCC is disclosed. At step 301, emission sinogram data are read into memory. At step 302, the data are subjected to a predetermined threshold, wherein data values below the predetermined threshold are discarded from the sinogram. Next, at step 303, an unfiltered back-projection calculation is performed to obtain a 3D image and the 3D image is subject to thresholding. Thresholds are selected in the projection data as well as reconstructed image data based on values within the projections from the truncated mu-map and background. In cases where tracers with high focal uptake are used, voxels are reconstructed and isolated so that they do not affect the thresholds and regularization parameters used.

Figure 4:
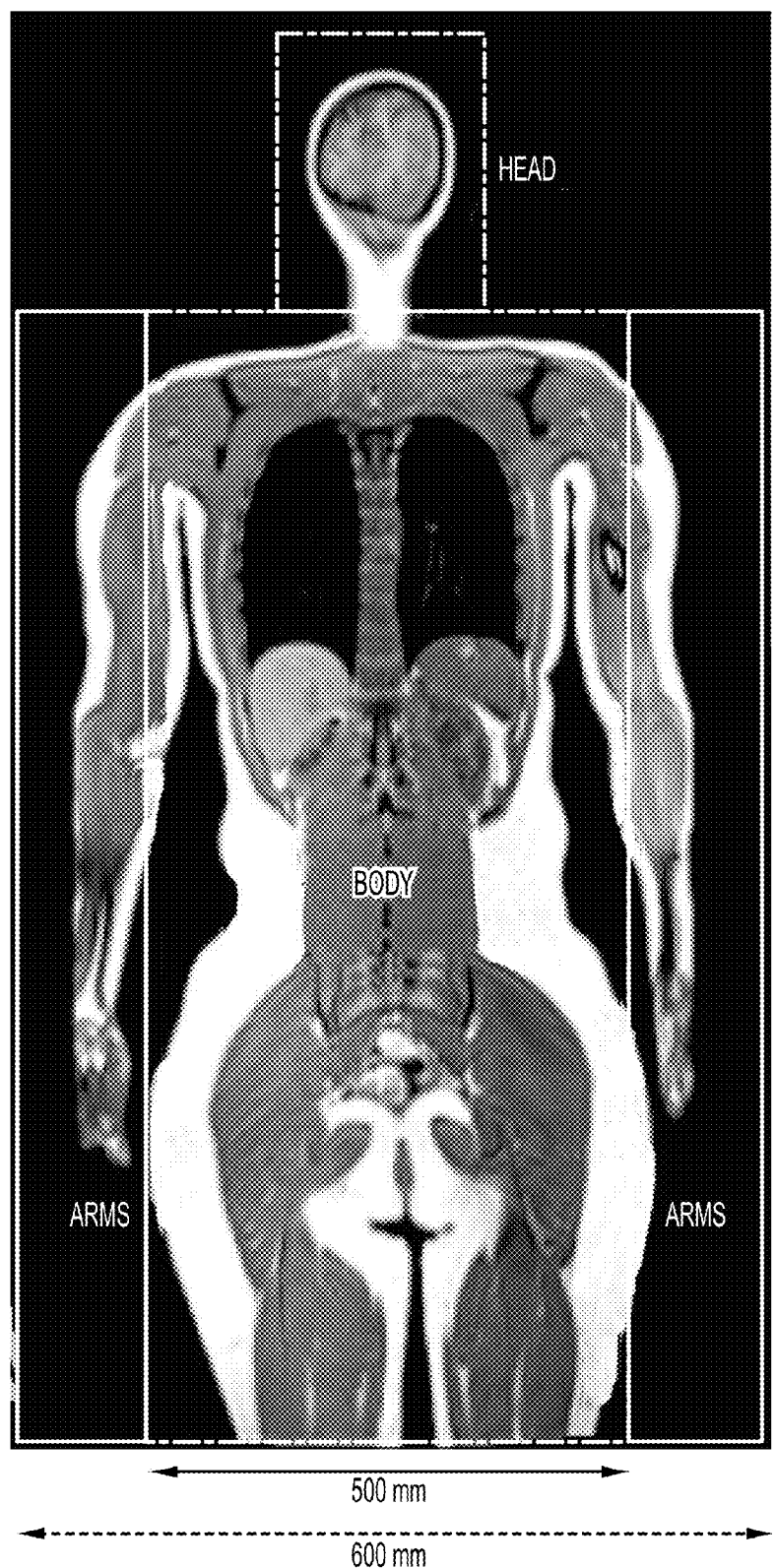
FIG. 4 is a diagram illustrating segmentation of a PET image based on variations in reconstructed images using predefined mu-values, according to the invention.

At step 304, the back-projected image is initialized to a series of segmented mu-maps with varying values outside the MR sampled mu-maps. As shown in FIG. 4, the mu-map may be segmented into separate segments for the body, head, and arms of the patient, based on variations in the reconstructed images generated using predefined mu-values. At step 305, the segmented mu-maps are forward projected.

Next, at step 306, the DCC algorithm is applied to the segmented mu-maps to determine optimal initial mu-map values and generate 3D regularization parameters for the MLAA. At step 307, the regularization parameters obtained by DCC are optimized. At step 308 the central (body) segment of the mu-map is replaced by the mu-map obtained from the MR data, and "hardware" mu-values (for truncated regions) are added to the mu-map for the other regions. At step 309, attenuation correction factors are then generated using the obtained mu-map, and a scatter sinogram is generated at step 310. At step 311, an estimated 3D emission image is generated using the obtained attenuation correction factors. The log-likelihood is determined using prior mu-values of air and tissue and the relative difference therebetween is implemented.

At step 312, a 3D estimate of the mu-map is determined from the estimated emission image and relative difference. At step 313, it is determined whether the number of iterations of the process has reached a predetermined value n. If the number of iterations performed is less than n (yes at step 313), then the process returns to step 307, to optimize regularization parameters for the mu-map values estimated at step 312, and to recomputed the 3D emission image and 3D mu-map estimates. If the number of iterations performed has reached the predetermined number n, (no at step 313), then the mu-map is written out or finalized at step 314 and used to generate clinical images.

Figure 5:
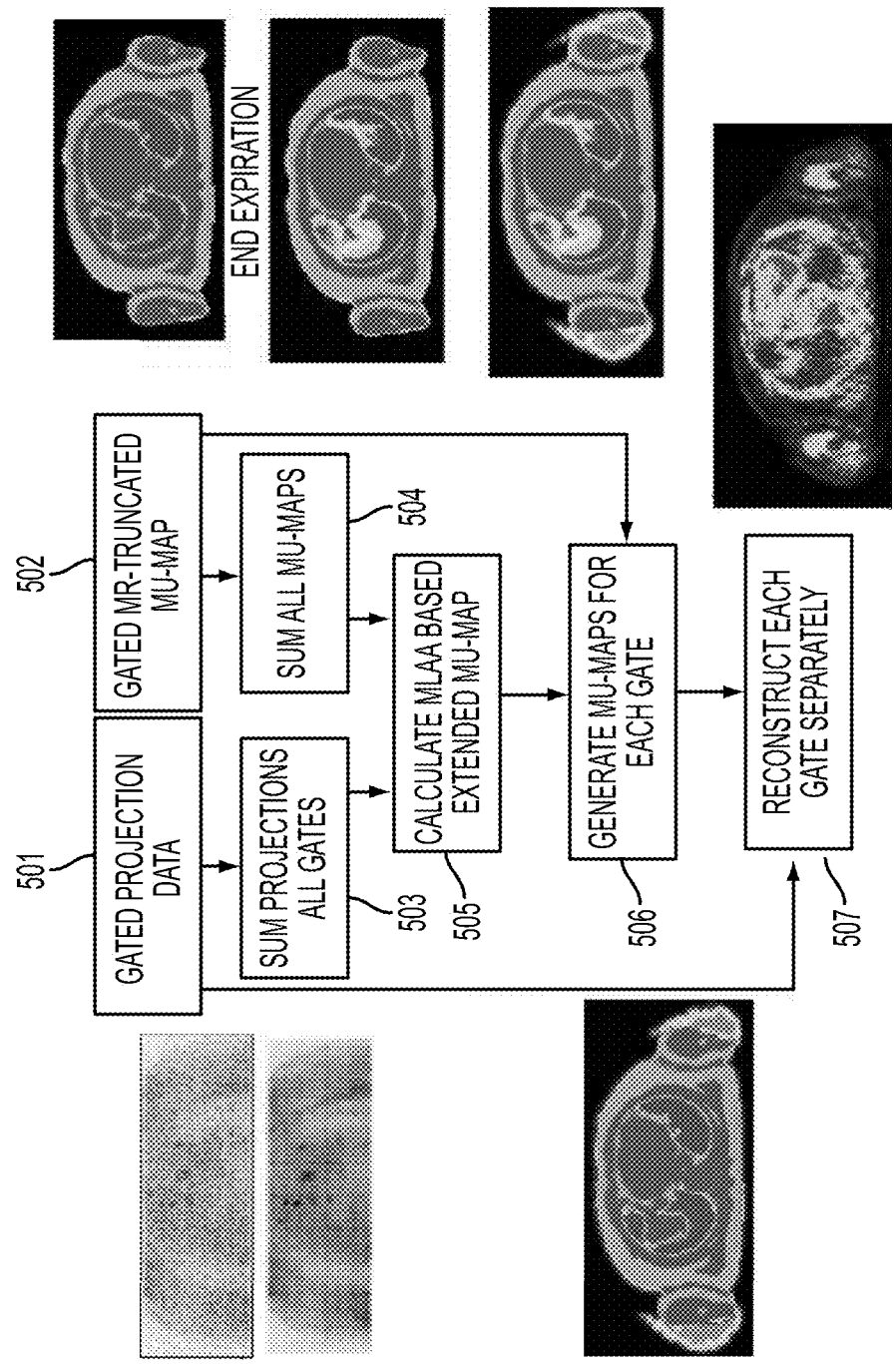
FIG. 5 is a flow diagram of a gated PET study according to the invention.

FIG. 5 illustrates an example application of the invention to gated imaging studies, such as gated respiratory studies and gated cardiac studies. The MLAA algorithm uses the measured emission counts emitted from the areas of the patient that are truncated in the MR images, to estimate the missing mu-values. Here, MLAA simultaneously estimates the emission as well as attenuation values using an intensity prior that favors mu-values of air and tissue. In gated MR/PET cardiac studies, the PET data is framed into multiple gates 501, and a series of MR based mu-maps corresponding to each gate is generated, 502. The number of PET emission counts detected within each gate is relatively small, resulting in a noisy estimate of the MLAA based extended mu-map. To reduce the noise in the extended mu-map, we combine the PET data from all gates 503. Similarly, the MR-truncated mu-map data from all gates is combined 504. Once the extended mu-map is generated 505, the central region is replaced with the MR based mu-map corresponding to that particular gate 506. Emission images are then reconstructed separately for each gate at 507.

Figure 6:
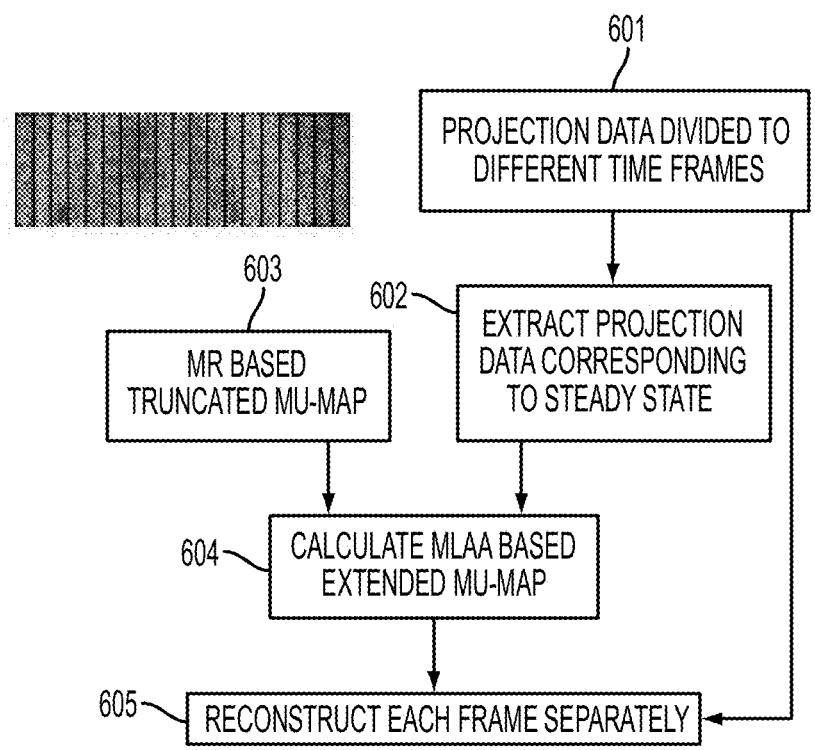
FIG. 6 is a flow diagram of a dynamic PET study according to the invention.

On the other hand, as shown in FIG. 6, in dynamic PET studies the uptake in the patient's arms (i.e. the truncated part of the mu-map) reaches a steady state only after the tracer distributes throughout the body. Hence, for dynamic scans, the projection data of all frames is summed and used to generate the MLAA based extended mu-map for all frames. Specifically, at 601, the projection data of a dynamic study are divided into different time frames. At 602, projection data corresponding to tracer steady state are extracted from the different time frames and summed. MR-based (i.e. truncated) mu-map data are obtained at 603. The extended mu-map is then calculated from the summed steady state projection data and the truncated mu-map data using MLAA at 604. Emission images are then separately calculated for each frame at 605.

Reconstructed images were evaluated qualitatively for both dynamic and gated cardiac MR/PET studies. The bias in the reconstructed image within the MR FOV was reduced to less than 5% when the MLAA based extended mu-map is used. Therefore, it was established that application of an MLAA based extended mu-map to dynamic and gated cardiac studies helps to improve the accuracy of the scatter estimation and reduce the local artifacts present when truncated mu-maps are used.

In summary, the present invention expands the MLAA algorithm for use with non-uniform biodistribution tracers, i.e. tracers having a strong focal uptake, by selection of data-driven thresholds and use of DCC-obtained regularization parameters. Mu-maps can be generated for MR-PET studies in the presence of metal implants in the patient, by segmenting the initial mu-map estimate and using a combination of DCC and MLAA in an iterative manner to improve the overall mu-map. The DCC-MLAA process also can identify and correct issues where mu-values of fat are erroneously assigned to tissue and vice-versa in MR-PET based mu-maps, or where mu-values of lungs are erroneously assigned a value of zero. Using DCC to generate 3D regularization parameters for MLAA can reduce the need for MLAA updating of voxels for which there is a higher confidence level for initial mu-map estimate.

What is claimed is:

1. A method of generating an emission image data attenuation correction map for an object, comprising:
    obtaining emission image data of said object from a nuclear medicine imaging modality;
    subjecting the obtained emission image data to a predetermined threshold to obtain thresholded emission image data;
    back-projecting the thresholded emission image data to obtain a 3D image;
    initializing the back-projected 3D image to an initial attenuation correction map obtained from a second imaging modality, with attenuation values outside a field of view of said second imaging modality being estimated based on said emission image data;
    forward-projecting the initial attenuation correction map;
    obtaining regularization parameters for the forward-projected initial attenuation correction map;
    applying the obtained regularization parameters to said initial attenuation correction map to obtain an optimized initial attenuation correction map;
    replacing said initial attenuation correction map with said optimized initial attenuation correction map;
    generating a 3D estimate of an emission image by applying attenuation correction factors generated from said optimized attenuation correction map; and
    generating a 3D estimate of an attenuation correction map by performing a maximum-likelihood calculation using said generated 3D emission image estimate.

2. The method of claim 1, further comprising optimizing regularization parameters for said 3D attenuation correction map estimate, generating a new 3D emission image estimate by applying attenuation correction factors generated from said optimized 3D attenuation correction map estimate, and generating an updated 3D estimate of an attenuation correction map by performing a maximum-likelihood calculation using said generated 3D emission image estimate, for a predefined number of iterations.

3. The method of claim 1, wherein said 3D estimate attenuation correction map is used for a gated emission imaging study.

4. The method of claim 1, wherein said 3D estimate attenuation correction map is used for a dynamic emission imaging study.

5. The method of claim 1, wherein said second imaging modality is magnetic resonance (MR) imaging.

6. The method of claim 1, wherein initializing the back-projected 3D image comprises initializing the back-projected 3D image to a series of initial segmented attenuation correction maps obtained from said second imaging modality, and generating 3D attenuation correction maps separately for each segment.

7. The method of claim 3, wherein initializing the back-projected 3D image comprises initializing the back-projected 3D image to a series of initial segmented attenuation correction maps obtained from said second imaging modality for each gate, and generating 3D attenuation correction maps separately for each gate segment.

8. The method of claim 4, wherein said dynamic emission imaging study is divided into different time frames, and initializing the back-projected 3D image comprises initializing the back-projected 3D image to a series of initial segmented attenuation correction maps obtained from said second imaging modality for each time frame, and generating 3D attenuation correction maps separately for each time frame segment.

9. A method of generating an emission image data attenuation correction map for a gated imaging study of an object, comprising:

obtaining gated emission projection data of said object from a nuclear medicine imaging modality;

obtaining corresponding gated truncated attenuation correction maps of said object from a second imaging modality having a field of view smaller than a field of view of said nuclear medicine imaging modality;

summing said gated emission projection data to obtain summed gated emission projection data;

summing said gated truncated attenuation correction maps to obtain a summed truncated attenuation correction map;

calculating an extended attenuation correction map including mu-values for regions outside the field of view of said second imaging modality, based on said summed gated emission projection data and said summed truncated attenuation correction map;

generating separate attenuation correction maps for each gate, based on said extended attenuation correction map; and reconstructing emission images separately for each gate by applying said separate attenuation correction maps to corresponding gated emission projection data.

10. The method of claim 9, wherein said second imaging modality is magnetic resonance (MR) imaging.

11. A method of generating an emission image data attenuation correction map for a dynamic imaging study of an object, comprising:

obtaining dynamic emission projection data of said object from a nuclear medicine imaging modality, wherein said dynamic imaging projection data is divided into different time frames;

obtaining a truncated attenuation correction map of said object from a second imaging modality having a field of view smaller than a field of view of said nuclear medicine imaging modality;

extracting steady state projection data from said time frames of dynamic emission projection data and summing said steady state projection data to obtain summed dynamic emission projection data;

calculating an extended attenuation correction map including mu-values for regions outside the field of view of said second imaging modality, based on said summed dynamic emission projection data and said truncated attenuation correction map; and reconstructing emission images separately for each frame by applying said extended attenuation correction map to corresponding dynamic emission projection data.

12. The method of claim 11, wherein said second imaging modality is magnetic resonance (MR) imaging.

* * * * *